INVENTOR
OSCAR SCHLÄPFER

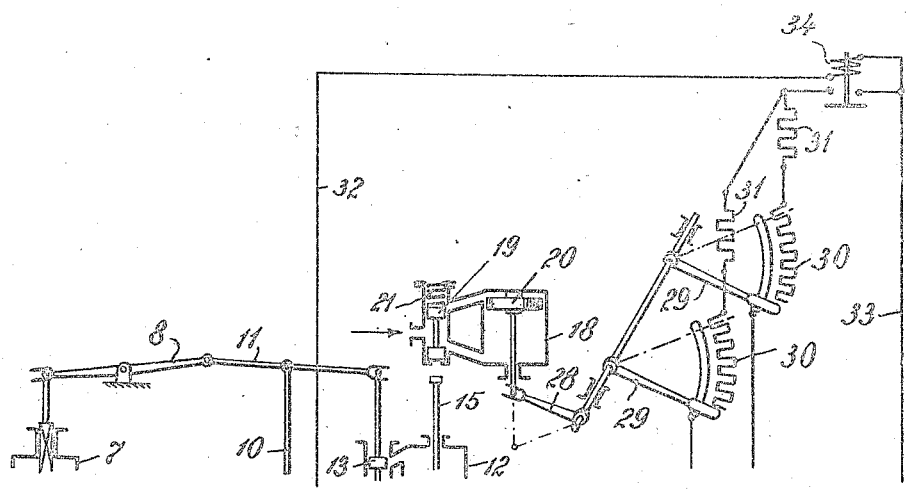
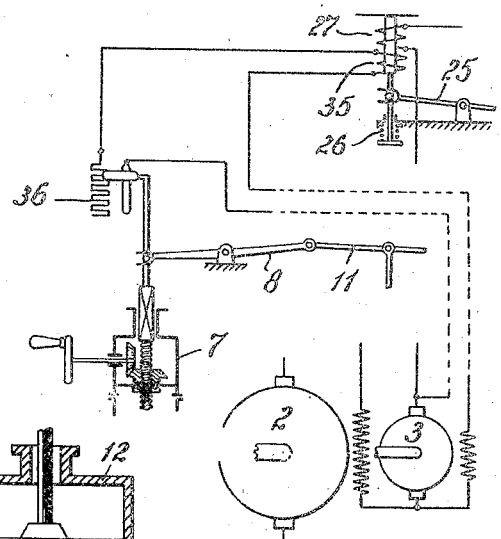
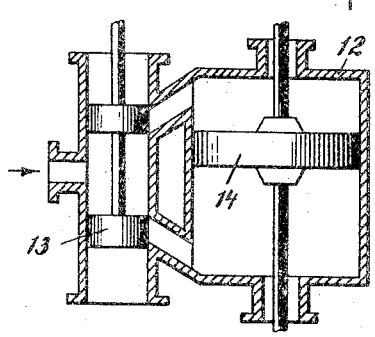

Patented Dec. 30, 1947

2,433,628

UNITED STATES PATENT OFFICE 2,433,628

DIESEL-ELECTRIC VEHICLE WITH AUTOMATIC WEAKENING OF THE FIELDS OF THE DRIVING MOTORS

Oscar Schläpfer, Winterthur, Switzerland, assignor to Sulzer Frères, Société Anonyme, Winterthur, Switzerland Application September 20, 1944, Serial No. 554,892
In Switzerland January 8, 1944

6 Claims. (Cl. 290—17)

1

The invention relates to an automatic control device for Diesel-electric vehicles and consists in that a servomotor adjusting the weakening of the fields of the driving motors is controlled in accordance with the field regulator adjusting the excitation of the main generator, for constant speed of the Diesel engine, to constant load, the regulators for regulating the fields of the main generator and of the driving motors being designed for instance as astatic regulating members and the control member of the latter having in its closed position so great a degree of overlapping that the field regulator of the generator can move, in the neighbourhood of the position for short-circuited resistance, without bringing this control member out of its closed position, over such a large range that the change of load presenting itself within this range is at least as great as the change of load caused by the greatest step of the field weakening.

Automatic methods of control have already been employed in which, after a certain voltage of the generator is reached, the fields of the driving motors are weakened. The speed of the vehicle can then be further increased while the full output is maintained without it being necessary for the generator voltage to be increased also. These methods of control, however, have the disadvantage that the regulation is effected in one range of vehicle speed with the regulation of the voltage of the main generator and in a range lying completely outside of the first-mentioned range with field regulation of the driving motors.

If the speed in the range of the field regulation of the driving motors is just at a value at which the output, at the step of the field weakening switched-in, is too high and the preceding step is too low, a field weakening switch continually switches in and out owing to the automatic regulation. This is injurious for the commutation of the driving motors, and as for these only series-winding comes into consideration and the regulation is thus done in the main circuit, comparatively strong currents have continually to be switched, so that the burning of the contacts in the switches in question is very considerable.

These difficulties are overcome according to the invention in that the regulation of the voltage continues to function during the regulation of the field weakening, so that after the switching-in of a certain step of field weakening and the resultant overloading of the Diesel engine, this step cannot immediately be switched out again, but the corresponding decrease of output is effected by reduction of the generator voltage.

2

Only when, in the course of the further acceleration of the vehicle, the voltage has again risen to the same value as at the time of the switching-in of the field weakening step mentioned above, does the device switch in a further field weakening step.

Fig. 1 shows the switching diagram of a Diesel-electric vehicle with automatic weakening of the fields of the driving motors.

Figs. 1a and 1b are fragmentary enlargements of a part of the apparatus of Fig. 1.

Fig. 2 shows a corresponding arrangement with another design of the apparatus necessary for limiting the weakening of the fields to service at high voltage.

Fig. 3 illustrates a further design of the member serving to limit the weakening of the fields.

Figures 1, 1A:
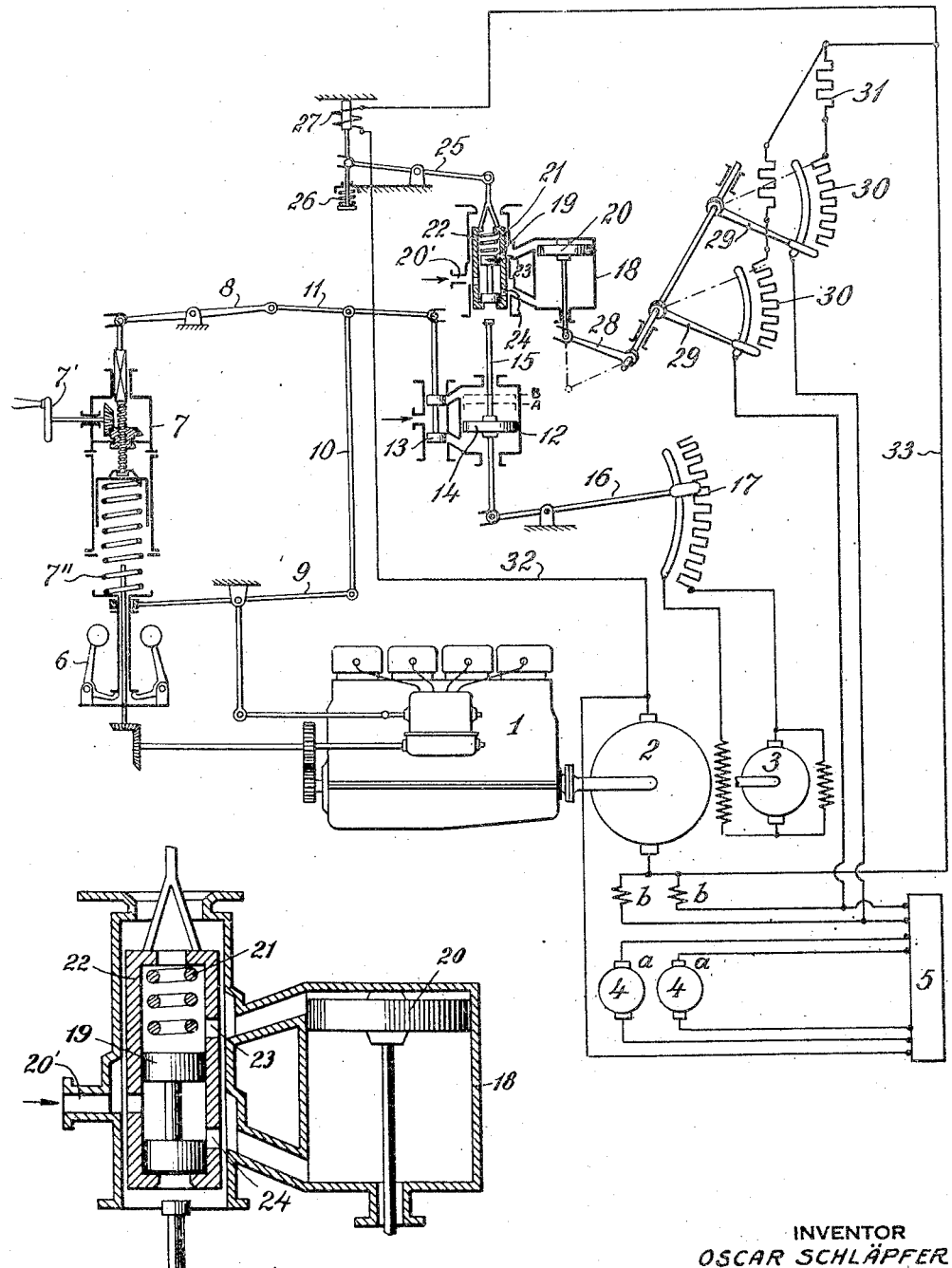

In Fig. 1 the Diesel engine 1 drives the generator 2 and the auxiliary generator 3, which latter supplies among other things the excitation for the main generator. The main generator 2 feeds the driving motors 4 through various members for switching out, for reversing and for protection, and represented in the drawing by the rectangle 5. The centrifugal governor 6 is under the control of a spring 7'', the action of which is regulated by the handwheel 7' which drives the gears in the device 7.

By means of the linkage 8—11 and the field regulating servomotor 12 the voltage of the main generator 2 excited by the auxiliary generator 3 is regulated in accordance with the position of the Diesel engine governor 6 in such a way that, at a certain position of the speed adjusting device 7, the load on the Diesel engine 1 remains constant. On the other hand the linkage 8—11 serves to adjust the output and torque in accordance with the speed.

The servomotor 18 has a valve 19 operated by the rod 15 of servomotor 12 and an intermediate valve 22 operated by the electromagnet 27 electrically connected to the generator 2. The piston 20, operated by fluid entering port 20' under the control of valves 19 and 22, is connected to the crank 28 which operates the levers 29. These means ensure that the piston 20 can only move out of the position shown, which corresponds to service with the full field of the driving motors, when the main generator 2 has at least reached a voltage which is higher than the lowest voltage at full load and at the speed in question.

The method of working the field weakening servomotor 18 is as follows: In the position of the field regulator piston 14 shown, the piston rod 15 makes no contact with the valve 19, which is pressed downwards by the spring 21, in spite of the fact that the magnet 27 connected to the terminals of the main generator 2 through the wires 32 and 33 has drawn up its armature in opposition to the pressure of the spring 26 and has pressed the intermediate valve 22 downwards. The opening 24 in the intermediate valve 22 then connects the lower side of the piston 20 with the pressure oil admission, while the oil opening 23 is open for the discharge of oil. The piston 20 thus remains in the upper position shown, so that the lever 28 remains turned upwards and the levers 29 keep the shunt circuit of the driving motor fields disconnected.

If now the upper edge of the piston 14 comes into the position A as the speed of the vehicle rises, the rod 15 of the piston contacts the valve 19 and on moving further upwards raises it from the intermediate valve 22. The openings 23 and 24 are gradually closed and remain closed by the valve 19 on account of the rather marked overlapping until the piston 14 has arrived almost in the end position B. Shortly before this position is reached, the lower edges of the valve 19 free the openings 23 and 24, so that now pressure medium passes through the pipe 20' to the upper side of the piston 20, while the lower side of the piston 20 is open for the discharge of oil. The piston 20 thus moves downwards and the lever 29 switches in the first step of the resistance 30.

In this way a parallel circuit to the fields b of the driving motors 4 is closed. The current of the driving motors increases; as the voltage of the generator 2 has remaned constant owing to the approach of the piston 14 to its upper end position, the load on the generator also increases, the weights of the governor 6 move inwards, the lever 9 turns counter-clockwise, the rod 10 and the valve 13 move upwards, as the lever 11 also turns counter-clockwise as a result of this movement, so that the piston 14 is again pressed downwards.

Before the rod 15 moves away from the valve 19 the openings 23 and 24 have already closed. The piston 20 thus comes to a standstill while the resistance 17 increases until the field of the generator 2 is weakened as much as is necessary for the maintenance of the constant output with the increased driving motor current. In order to attain the desired aim, namely to prevent oscillation of the field weakening switch 29, it is also necessary to choose the overlapping of the valve 19 and the gradation of the resistances 17 and 30 in such a way that the relief of the main generator 2, while the piston 14 moves through a distance corresponding to the overlapping of the valve 19, is at least as great as the overloading which presents itself when the lever 29 is switched one step.

In this way the levers 29 then move step by step upwards until the whole adjustable resistance 30 is switched out, while the piston 14 oscillates backwards and forwards roughly between position A and positon B. When the levers 29 have switched out the whole adjustable reistance 30, only the resistances 31 are still in the shunt circuits and the maximum shunting is thus attained.

The magnet 27 and the intermediate valve 22 are necessary for the following reasons. In order to reduce the regulating range of the resistance 17 to a minmum, it is customary to give the generator 2 a falling voltage characteristic by means of a suitable combination of windings (for example separate excitation, shunt, differential compound windings). The greatest excitation then presents itself not only at maximum voltage but also at maximum demand. In the latter case it would not only be useless to shunt the driving motors, but it would be injurious for the motors themselves.

The weakening of the fields at low voltage is prevented by the magnet 27 in the following manner: As long as the voltage is too low to overcome the pressure of the spring 26, the intermediate valve 22 is drawn into its upper end position. The rod 15, in the position B of the piston 14, then no longer comes in contact with the valve 19, and the piston 20 is continually under pressure from its underside, so that there is no weakening of the fields.

The valve 19 in Fig. 1 is pressed by the spring 21 against a stop on the intermediate valve 22. It would also be possible, however, to provide a fixed stop, in that the piston 20, with the intermediate valve lifted, is operated from below by pressure medium even when the piston 14 has come into the position B and the rod 15 has pushed the valve 19 to the top.

While in Fig. 1 the blocking of the field weakening device is done by the magnet 27, in Fig. 2 a relay 34 serves this purpose. This relay 34 is also connected to the generator 2 through the leads 32 and 33 and closes the field weakening circuit only when the voltage of the generator has reached a certain value. The field weakening servomotor 18 thus comes into action here every time the field regulator piston 14 comes into the upper end position B. The weakening of the field, however, does not come into effect, because the circuit from the one side of the fields 4b through the resistances 30-31 to the other side of the field is not closed.

The automatic field weakening device according to the invention is not necessarily bound to have the allocation of one torque to each speed as shown in Fig. 1. The speed and the torque may equally well be adjusted by separate members.

The gradation of the resistances 30 can be quite fine, as this offers advantages, as compared to gradation by field weakening in larger steps with relays, with respect to the commutation of the driving motors, the overloading of the Diesel engine and vibration-free running of the vehicle. The voltage at which the resistance 17 is short-circuited decreases with decreasing speed. Should calculation show that the lowest voltage at which the member 27 (Figs. 1 and 3) or the member 34 (Fig. 2) should respond at the highest engine speed is higher than the highest voltage at the lowest speed at which field weakening is still desired, a resistance can be combined with the device 7 so as to make the voltage at which the members 27 or 34 respond partly dependent on the speed. To specifically illustrate this construction the magnet 27 is illustrated in Fig. 3 provided with an auxiliary winding 35 through which the exciting current of the auxiliary generator 3 flows, and which has the desired effect because, as the exciting current of the auxiliary generator decreases with decreasing engine speed, the strength of the current is adapted to the speed by means of the resistance 36 connected to the speed adjusting device 7 in such a way that the voltage of the auxiliary generator 3 remains constant. In both forms of execution, weakening of the fields is provided in the form of shunting. A control method according to the invention, however, might equally well be employed on a field weakening device by means of field tapping or on a device combining shunting and tapping.

I claim:

1. The improvement in Diesel-driven electrical apparatus which comprises a generator driven by the Diesel engine, an auxiliary generator for supplying exciting current to the generator, at least one electric motor driven by current from the generator, a speed governor driven by the Diesel engine, a field resistance for altering the field of the said generator, a first regulator for setting the field resistance, means connecting the speed governor with said first regulator, whereby the field resistance changes when the speed of the Diesel engine changes, the effect being that the load on the Diesel engine is kept constant, a resistance for connecting in parallel to the field of each motor, a switch for each of the resistances, a second regulator for altering the switched-in part of each motor resistance, means connecting the said regulators operatively with each other, whereby the second regulator, when the first regulator has short circuited the respective resistance, is actuated with an increase in the speed of the engine in the sense of a decrease in the resistance, and with a reduction in the speed of the engine in the sense of an increase in the resistance, in such a manner that the load on the Diesel engine is kept constant also in the load range of the second regulator.

2. Apparatus as claimed in claim 1, which comprises a second regulator in the form of an hydraulic servomotor, valve means for regulating the servomotor, means connected electrically with the generator in order to displace the valve means so that the first regulator cannot function as long as the generator has a low voltage, the fields of the motors being then in the position corresponding to the full field.

3. The improvement in Diesel-driven electrical apparatus which comprises a generator driven by the Diesel engine, an auxiliary generator for supplying exciting current to the generator, at least one electric motor driven by current from the generator, a speed governor driven by the Diesel engine, a field resistance for altering the field of the said generator, a first regulator for setting the field resistance, means connecting the speed governor with said first regulator, whereby the field resistance changes when the speed of the Diesel engine changes, the effect being that the load on the Diesel engine is kept constant, a resistance for connecting in parallel to the field of each motor, a switch for each of the resistances, a second regulator for altering the switched-in part of each motor resistance, means connecting the said regulators operatively with each other, whereby the second regulator, when the first regulator has short circuited the respective resistance, is actuated with an increase in the speed of the engine in the sense of a decrease in the resistance, and with a reduction in the speed of the engine in the sense of an increase in the resistance, in such a manner that the load on the Diesel engine is kept constant also in the load range of the second regulator, the overlapping of the control member of the field weakening device being so great that the field regulator of the generator moves, without displacing the servomotor of the driving motor field weakening, over a range of the regulating resistance which allows a change of load to be equalised that is at least as great as the change of load caused by a movement of one step of the field weakening resistance.

4. The improvement in Diesel-driven electrical apparatus according to claim 1 which comprises a relay electrically connected to the generator and responsive to the voltage thereof, switch means in the circuit of the motor field resistance in operative connection with the relay, whereby the circuit for the motor field resistance is closed only when the generator voltage reaches a predetermined value.

5. The improvement in Diesel-driven electrical apparatus according to claim 1, characterised in that the device dependent on the generator voltage is given an auxiliary winding the excitation of which is so regulated that the voltage at which it responds is different for different speeds of the Diesel engine.

6. The improvement in Diesel-driven electrical apparatus according to claim 1, characterised in that the auxiliary winding of the device dependent on the generator voltage is flowed through by the exciting current of the auxiliary generator.

OSCAR SCHLÄPFER.

REFERENCES CITED

The following references are of record in the file of this patent:

UNITED STATES PATENTS

| Number | Name | Date |
|---|---|---|
| Re. 22,588 | Kew | Jan. 9, 1945 |
| 786,376 | Nilson | Apr. 4, 1905 |
| 865,813 | Powell | Sept. 10, 1907 |
| 1,072,656 | Schley | Sept. 9, 1913 |
| 1,282,855 | Kennedy | Oct. 29, 1918 |
| 1,833,017 | Cutler | Nov. 24, 1931 |
| 2,060,900 | Simmen | Nov. 17, 1936 |
| 2,131,527 | Sousedik | Sept. 27, 1938 |
| 2,172,298 | Sousedik | Sept. 5, 1939 |
| 2,182,644 | Schaelchlin | Dec. 5, 1939 |